United States Patent [19]

Sami

[11] Patent Number: 5,309,732
[45] Date of Patent: May 10, 1994

[54] COMBINED CYCLE AIR/AIR HEAT PUMP

[75] Inventor: Samuel Sami, Moncton, Canada

[73] Assignee: University of Moncton, Moncton, Canada

[21] Appl. No.: 864,760

[22] Filed: Apr. 7, 1992

[51] Int. Cl.$^5$ .......................... F25B 13/00; F25B 47/00
[52] U.S. Cl. ...................................... 62/277; 62/324.1; 62/324.5; 252/67
[58] Field of Search ................. 62/324.1, 324.2, 324.5, 62/277, 275, 114; 252/67

[56] References Cited

U.S. PATENT DOCUMENTS

| | | | |
|---|---|---|---|
| 4,598,558 | 7/1986 | Bingham | 62/324.1 |
| 4,827,733 | 5/1989 | Dinh | 62/305 |
| 4,840,042 | 6/1989 | Ikoma et al. | 62/324.1 |
| 4,843,837 | 7/1989 | Ogawa et al. | 62/324.1 |
| 4,938,035 | 7/1990 | Dinh | 62/279 |

Primary Examiner—Henry A. Benet
Assistant Examiner—William C. Doerrler
Attorney, Agent, or Firm—Beveridge, DeGrandi, Weilacher & Young

[57] ABSTRACT

An air-to-air heat pump has a first passageway having an inlet and an outlet both communicating with air outside the building, and having a first heat exchanger constituting an evaporator for a first refrigerant contained therein during a heating cycle, and has a second passageway having an inlet and an outlet both communicating with relatively warm air inside the building, and having a second heat exchanger constituting a condenser for the first refrigerant contained therein during the heating cycle and having the usual active heat pump circuit including the first and second heat exchangers. The invention provides a heat pipe containing a second refrigerant and having a first normally higher end in the first passageway and a second, normally lower end in the second passageway, the second refrigerant being capable of being evaporated by said relatively warm air in the second passageway and being capable of being condensed by cold air in the said first passageway. The first end is positioned in the first passageway upstream of the first heat exchanger whereby cold air is preheated by condensation of said second refrigerant before contacting said first heat exchanger so that frosting on the first heat exchanger in cold air conditions is inhibited.

10 Claims, 7 Drawing Sheets

ISOBARIC HEATING OR COOLING PROCESS OVER SATURATION TWO PHASE REGION

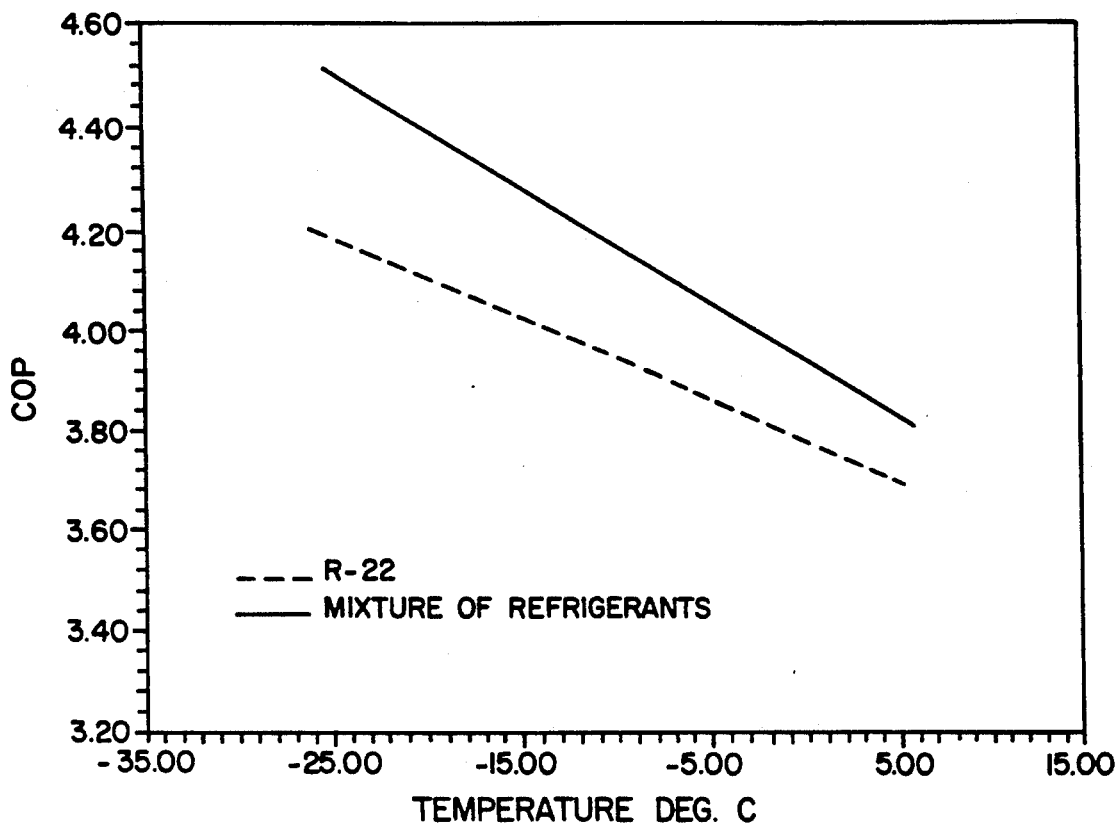
FIG.4 COEFFICIENT OF PERFORMANCE VS INLET AIR TEMPERATURE
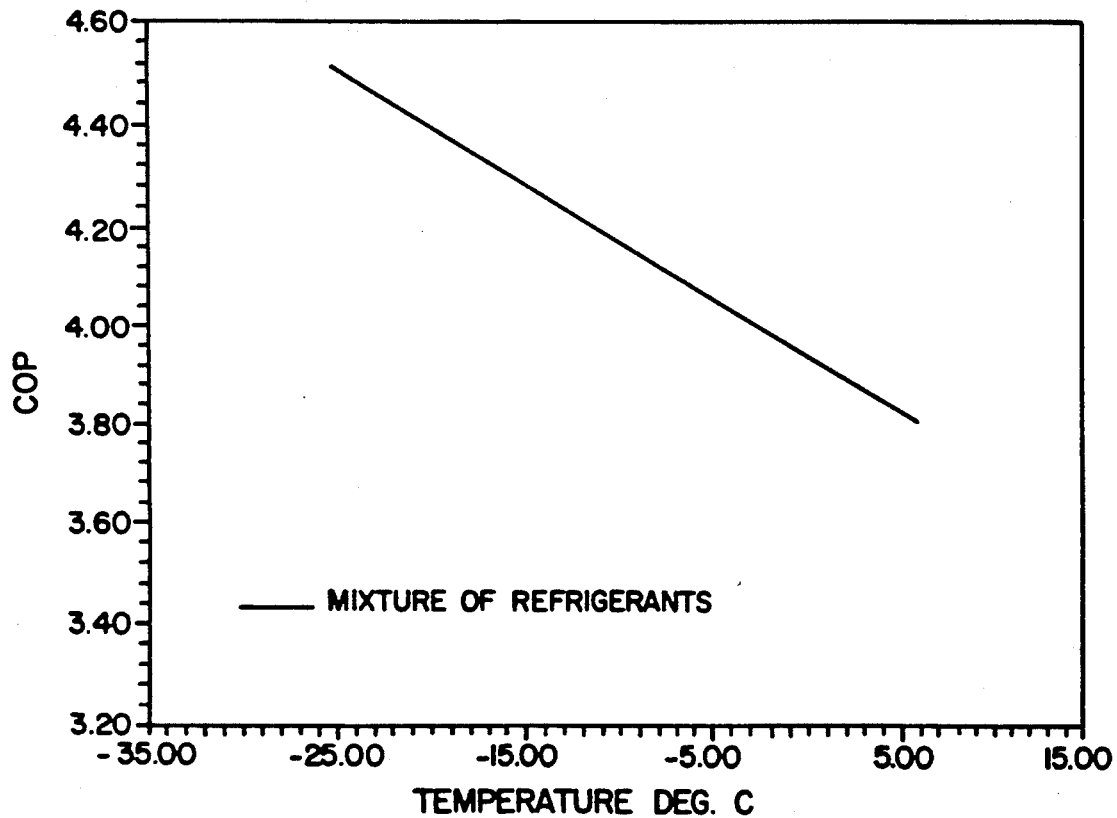
FIG.5 COEFFICIENT OF PERFORMANCE VS INLET AIR TEMPERATURE

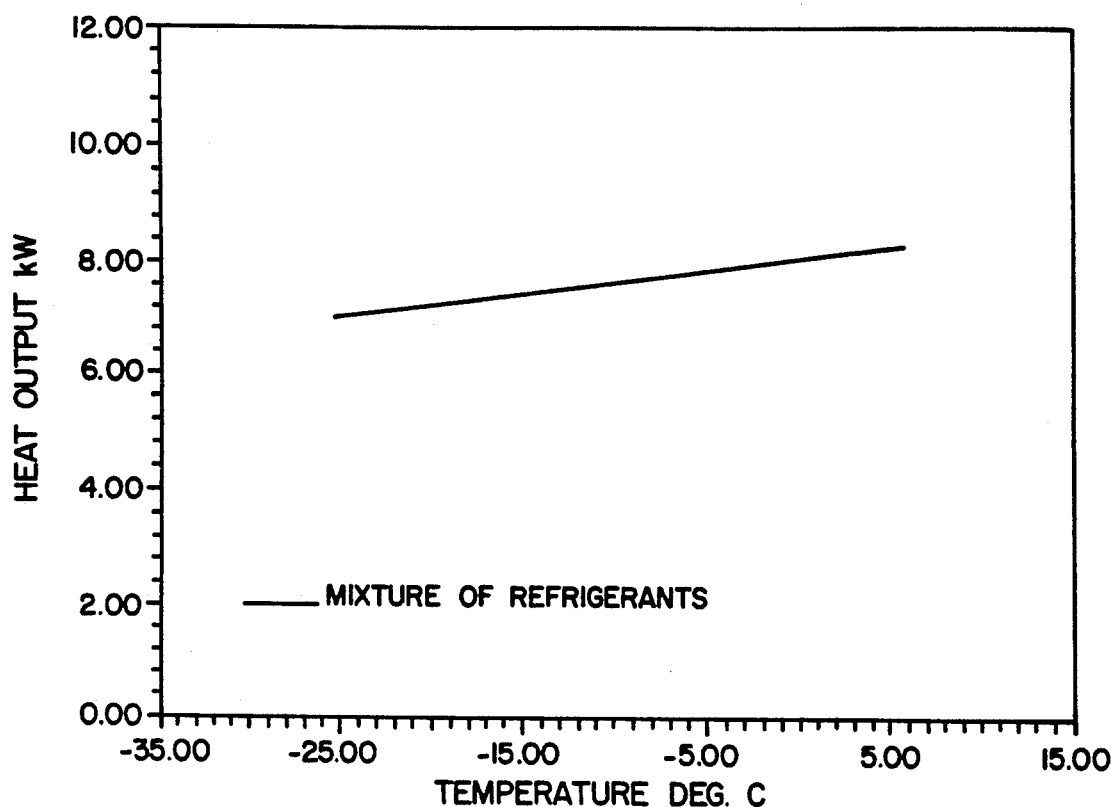
FIG. 6 CONDENSER HEAT OUTPUT VS INLET AIR TEMPERATURE
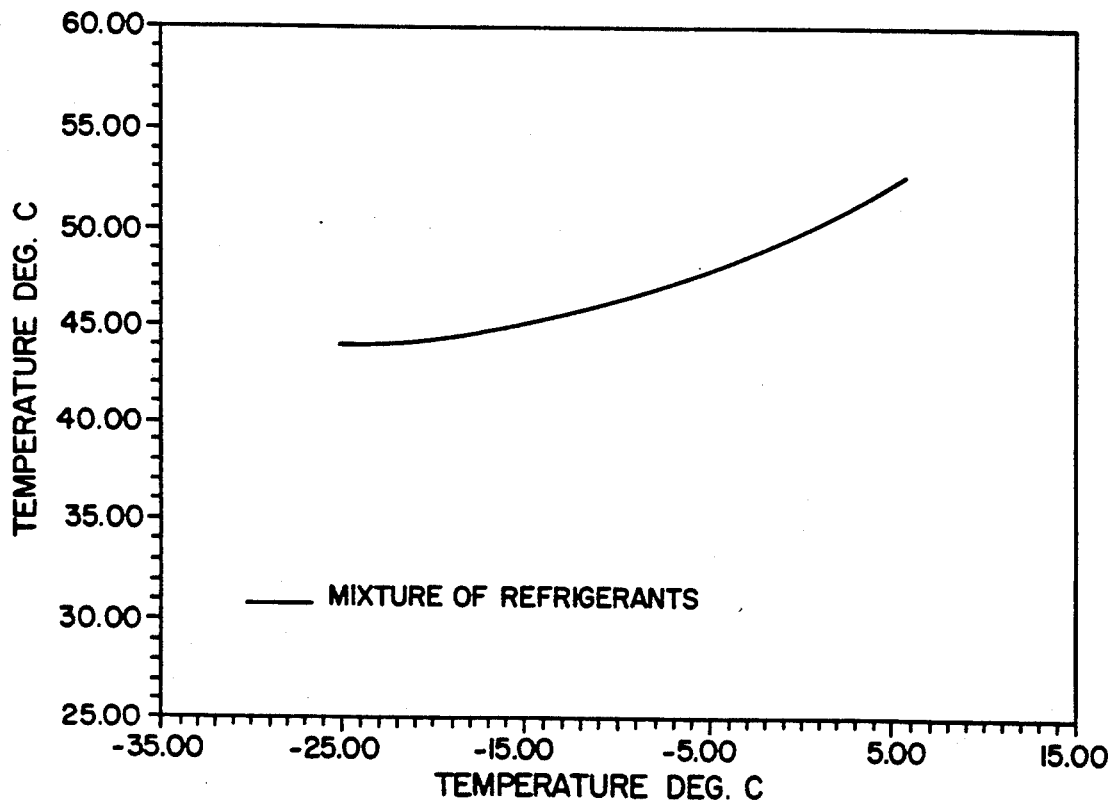
FIG. 7 REFRIGERANT TEMPERATURE-CONDENSER INLET VS INLET AIR TEMPERATURE

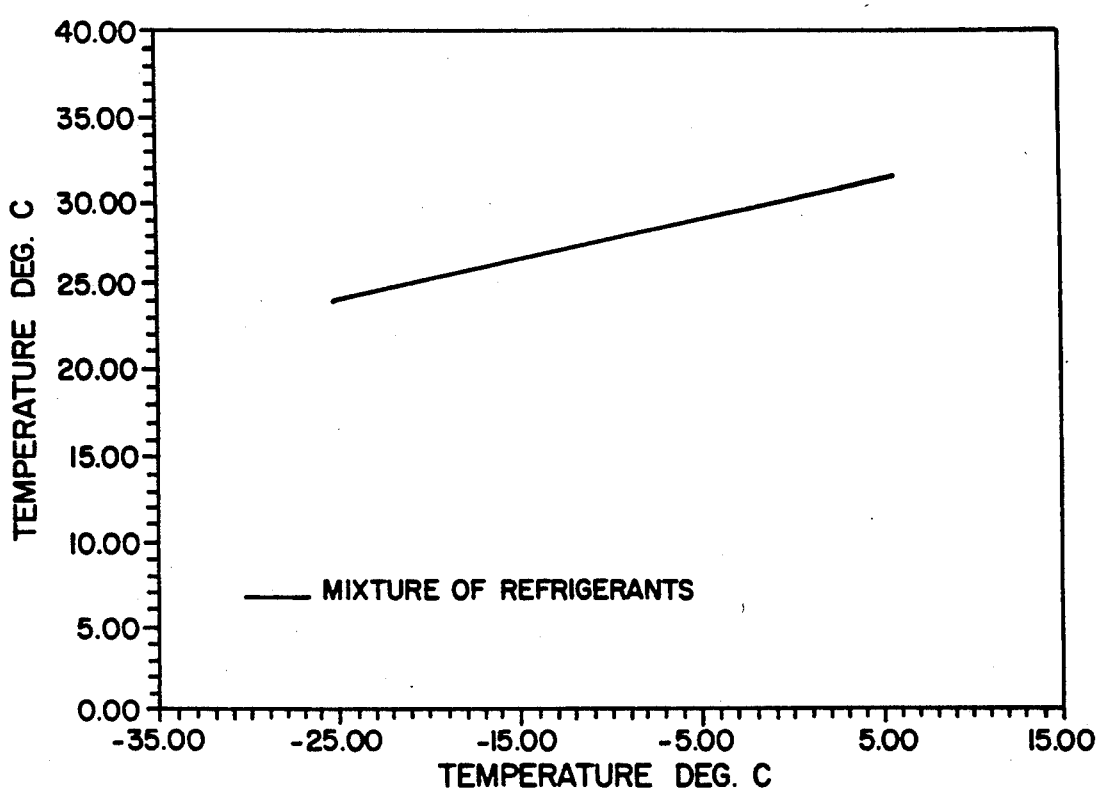
FIG. 8 AIR TEMPERATURE-CONDENSER OUTLET VS INLET AIR TEMPERATURE
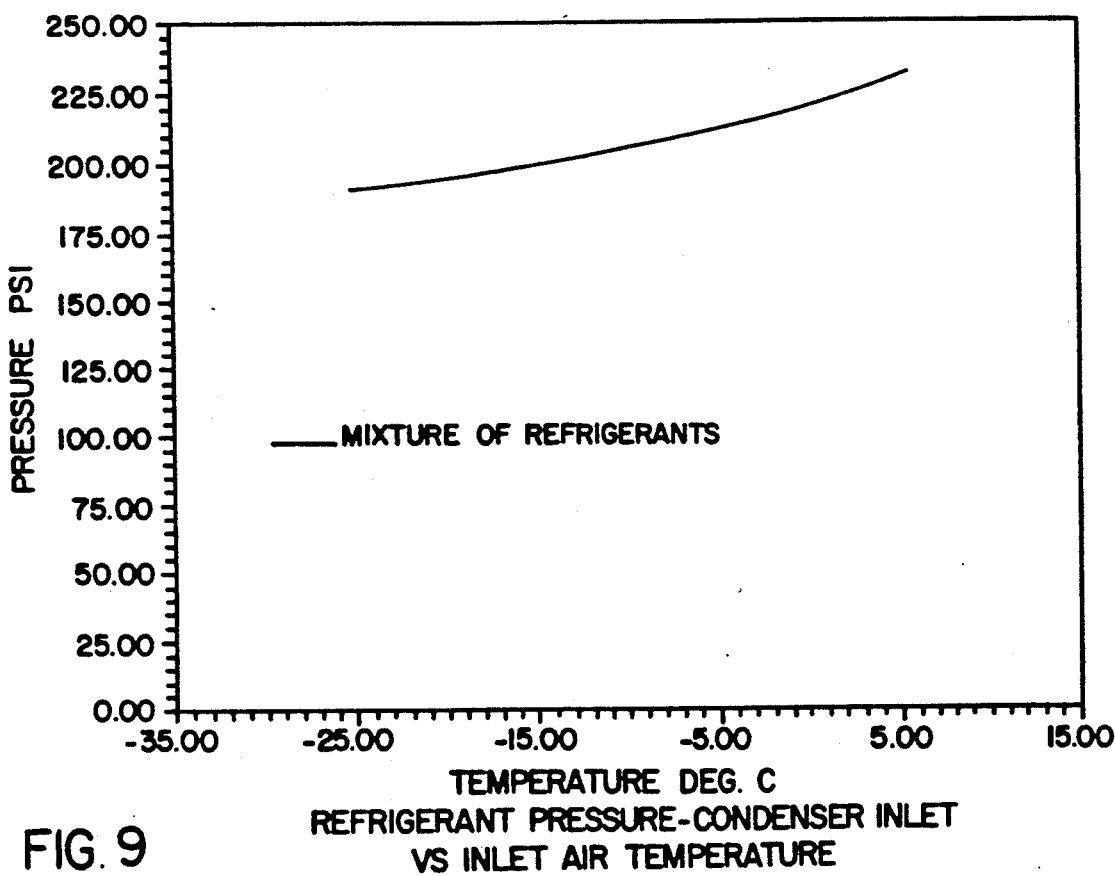
FIG. 9 REFRIGERANT PRESSURE-CONDENSER INLET VS INLET AIR TEMPERATURE

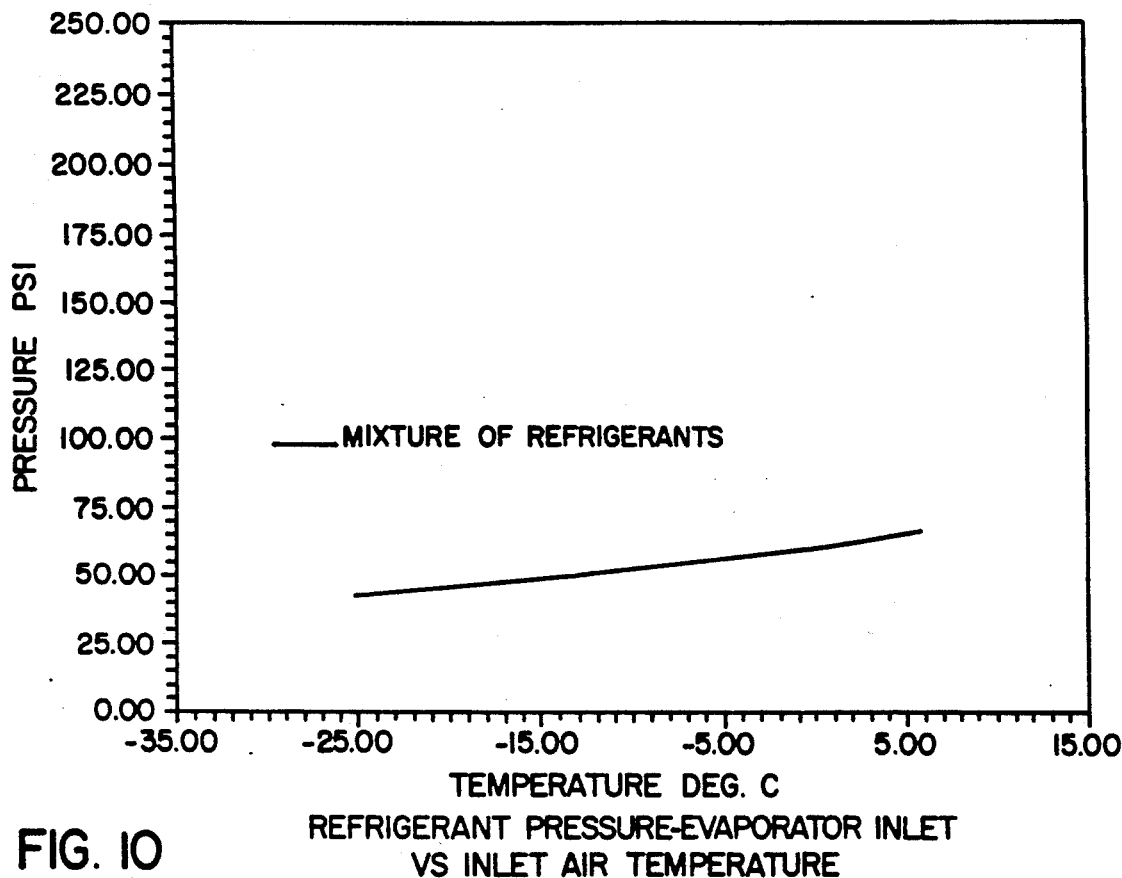
FIG. 10  REFRIGERANT PRESSURE-EVAPORATOR INLET VS INLET AIR TEMPERATURE
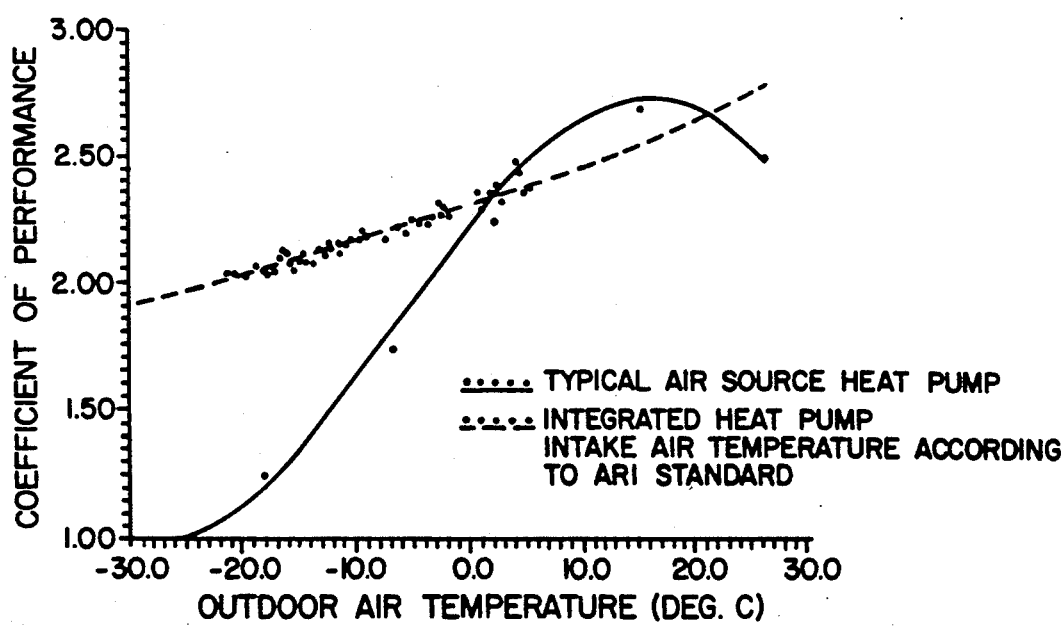
FIG. 11  COEFFICIENTS OF PERFORMANCE OF TYPICAL AIR-SOURCE HEAT PUMP AND INTEGRATED HEAT PUMP

COMBINED CYCLE AIR/AIR HEAT PUMP

BACKGROUND OF THE INVENTION

There are several advantageous features of heat pump systems which are not fully exploited. From a residential or small commercial building owners' perspective, there are the obvious savings associated with the installation of any type of heat pump system, as opposed to a conventional electric or fossil fuel system. For the respective utility, there is the potential for reduction in peak demand, and improved load dispersal, over the calendar year. Finally, in a society that has become increasingly conscious of the environment, heat pump systems offer an environmentally sound alternative to building heating and cooling.

In order to introduce a heat pump system using air as the heat source in cold regions, a number of technical problems must be solved, such as degraded performance at outside air temperatures below −8° C., as well as frosting on the evaporator coil at cold outside temperatures. Most of the deficiencies associated with air-/air heat pumps have been overcome in our proposed integrated design of heat pump.

The integrated heat pump system combines the proven efficiencies of heat pump technologies with the heat regenerative technologies to give the most efficient heating/cooling system, with capabilities to produce domestic hot water. The system uses environmentally sound blends of refrigerants that have less environmental impact than CFCs, and meet the standards set by the United Nations Environmental Program (UNEP) for Greenhouse Depletion Potential (GDP) and Ozone Depletion Potential (ODP).

The new system is much more efficient than existing air/air split systems for several reasons. In the existing systems, the air heats the refrigerants circulating in the outdoor section of the heat pump, which pass into the indoor system to finally heat the house. Unlike the existing systems, the new system provides a fully integrated unit; the cold air from outside is brought to the unit which is placed indoors. The heat extracted from the cold air is then pumped to heat the house. This reduces the heat loss and refrigerant pipes between the indoor and outdoor sections. Furthermore, the new system utilizes a passive heat pump to preheat the evaporator cold air, which enhances system efficiency in cold weather by reducing frosting on the evaporator. In addition, the refrigerant blend used in the new system is especially formulated to extract more heat from the cold air at lower temperatures.

Since the system uses air as the heat sink, no other cost is involved except air ducting. Therefore, unlike water or ground source heat pumps, it is the most affordable heating and cooling system.

This system is intended for retrofitting houses with fossil fuel furnaces, or for replacing base board electric heating systems.

Prior work has been reported on similar systems, by Dinh, (1), Sami, (2), Linton, J. W. (3 and 4), focused on ventilation and air exchanging of the buildings for humidity and odor control. However, the new system is fully intended for cooling and heating the interior air of the building, rather than providing air exchange or ventilation for buildings.

SUMMARY OF THE INVENTION

A known form of heat pump has:

a first passageway having an inlet and an outlet both communicating with air outside the building, and means for moving air through the first passageway from the inlet to the outlet, said first passageway having a first heat exchanger capable of evaporating a first refrigerant contained therein;

a second passageway having an inlet and an outlet both communicating with relatively warm air inside the building, and means for moving air from the inlet to the outlet, said second passageway having a second heat exchanger capable of acting as a condenser for said first refrigerant contained therein; and means for pumping said first refrigerant in a active heat pump circuit which includes said first and second heat exchangers, and pressure reducing means for maintaining the pressure of refrigerant higher in the condenser than the evaporator.

The heat pump of this invention has, in addition to these features, a so-called passive heat pump or "heat pipe", which is actually an array of closed pipes partially filled with a refrigerant. If such a heat pipe is arranged with a higher end in the cold passageway, there will be a continuous circulation of this refrigerant as this evaporates in the warm passageway and condenses in the cold passageway, with transfer of heat from the warm to the cold passageway. This constant recycling of fluid is analogous to a regenerative heat exchange system.

In accordance with this invention, in the known form of heat pump described above, a heat pipe containing a second refrigerant is provided with a first, normally higher, end in the first passageway and a second, normally lower, end in the second passageway. The second refrigerant is capable of being evaporated by relatively warm air in the second passageway and of being condensed by cold air in the first passageway. The first end is positioned in the first passageway upstream of the first heat exchanger whereby cold air in the first passageway is preheated by condensation of the second refrigerant before contacting the first heat exchanger so that frosting on the first heat exchanger in cold air is inhibited. Accordingly, this heat exchanger operates more efficiently in cold temperatures than is the case with prior art heat pumps.

The second end of the heat pipe is situated in the second passageway upstream of the second heat exchanger, so that in the heating cycle (i.e. winter conditions) it cools the inside air before this passes over the second heat exchanger and thereby improves the heat transfer at the second heat exchanger.

Further improvements in efficiency are achieved by use of novel non-azeotropic mixtures of refrigerants, for use both as the first and second refrigerants as referred to above.

The invention also provides a novel method of operating heat pump apparatus.

BRIEF DESCRIPTION OF THE DRAWINGS

FIGS. 4 and 5 are graphs showing changes in coefficients of performance with inlet air temperature for different refrigerants;

FIG. 6 is a graph showing heat output versus inlet air temperature;

FIG. 7 is a graph showing refrigerant temperature at the condenser inlet versus outlet air temperature;

FIG. 8 is a graph showing refrigerant temperature at the condenser outlet versus inlet air temperature;

FIG. 9 is a graph showing refrigerant pressure at the condenser inlet versus inlet air temperature;

FIG. 10 is a graph showing refrigerant pressure at the evaporator inlet versus inlet air temperature; and FIG. 11 shows a comparison between the results achieved with the integrated heat pump of this invention as compared to a conventional heat pump.

DESCRIPTION OF THE PREFERRED EMBODIMENTS

Figure 1:
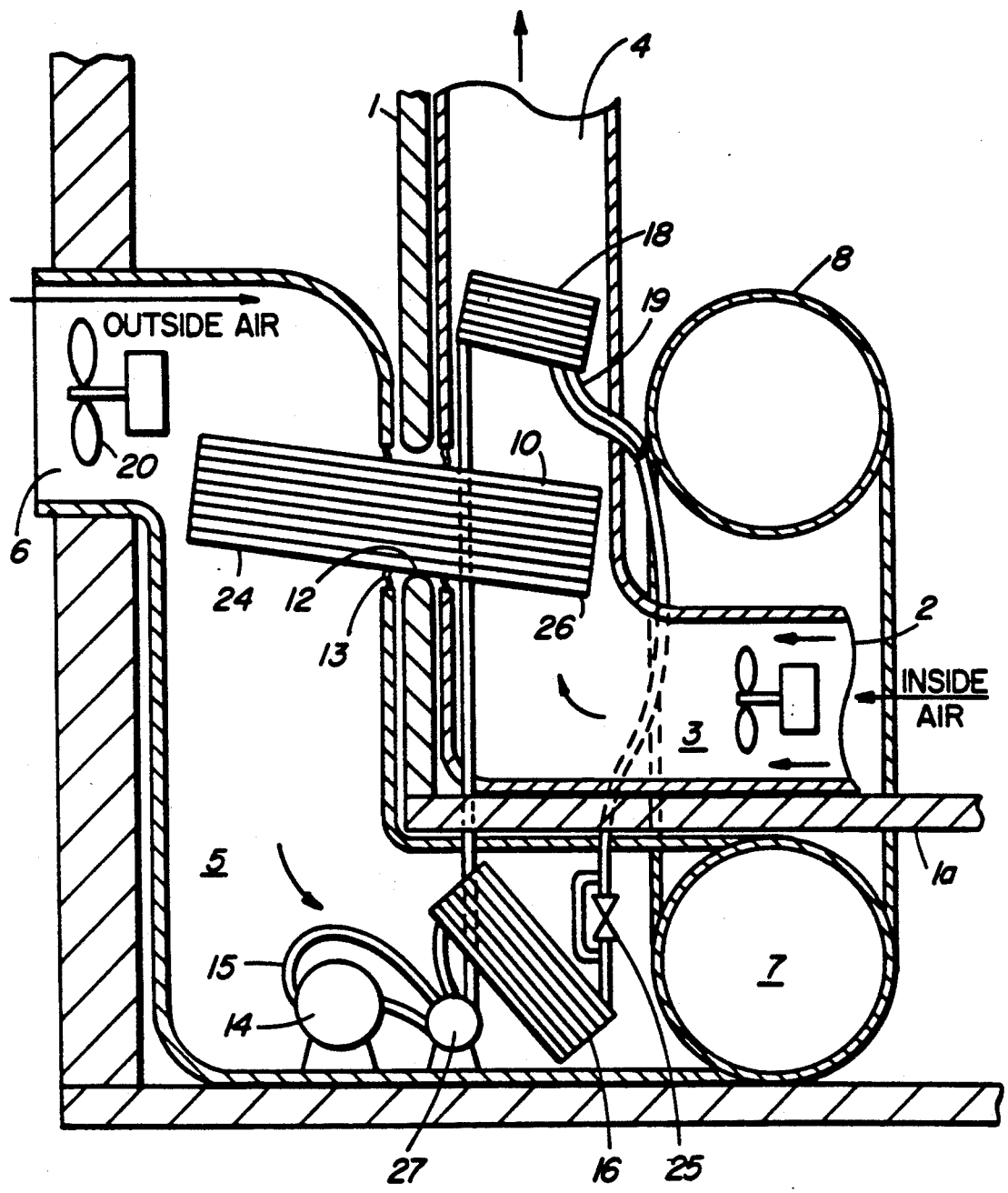
FIG. 1 shows a diagrammatic section through a heat pump in accordance with the invention, as installed in a building.

With reference to FIG. 1, the new system consists of an air/air heat pump combined with a passive heat pump or heat pipe. The heat system is divided into cold and warm passageways by wall 1 and floor 1a. Warm air from inside a building enters passageway 3 through inlet 2, and returns to the inside of the building through outlet 4. Cold air from outside the building enters passageway 5 through inlet 6 and returns to the outside of the building through duct 7 and outlet 8. A heat pipe core 10 is medially supported at pivot points 12 in the wall 1. The wall has a flexible material 13 around the portion of the heat pipe projecting through the wall and any associated ducts so that the core 10 may pivot without disturbing the continuity of the wall if this is desired. The core 10 is closed at both ends and is partially filled with a non-azeotropic refrigerant mixture described below.

The active air/air heat pump system is composed of heat exchanger coil 16, compressor 14, heat exchanger coil 18 and coil resistor 19, all contained in circuit 15 with expansion device-capillary tube arrangement 25, and reversing valve 27.

The resistor 19 is an item known per se for use with condensers in heat pumps, in that context it is also known as a "post condenser". It comprises a series of parallel tubes which provide an extension of the coil 16 being also within the passageway 3. This has the effect of providing additional pressure drop in the refrigerant after leaving the coil 16, so increasing the so-called "glide temperature" which is the variation in saturation temperature across the condenser (i.e. coil 16 combined with resistor 19 in the (winter) heating cycle) obtainable when using a non-azeotropic refrigerant mixture, as discussed below. This in turn increases the temperature potential between the condenser and incoming air which significantly enhances the heat transfer, producing a significant increase in coefficient of performance.

Device 25 comprises a pressure reducing valve which operates during the heating cycle, and a capillary device which is effective to reduce pressure during the cooling (summer) cycle. The pressure reducing valve is controlled, in generally known manner, by the temperature in coil 16 while acting as evaporator.

In winter time heating operation, heat pipe core 10 is tilted to about 5° from the horizontal, so that end 24 thereof is higher than end 26 as is shown in FIG. 1. With fans 20 and 22 activated, cold air passes across end 24 while warm inside air passes over end 26. The cold air causes the refrigerant mixture in the core to condense and flow to end 26. Warm household air passing over the lower end 26 causes the refrigerant mixture in the heat pipe to evaporate and thereby migrate to the upper end 24 of the heat pipe, where it releases its heat of condensation. This also results in cooling the inside air before it passes over coil 18. The net result is an increase of the temperature potential between the coil 18 and the air in passageway 3 which significantly enhances the heat transfer at coil 18.

The air in passageway 3, after passing over the coil 10, passes over coil 18 causing compressed refrigerant mixture to condense, while heating the air before it is returned to the inside. Simultaneously, cold outside air enters through 6 and passes over the upper end 24 of the heat pipe core. In doing so, the cold outside air absorbs heat from the wall of the core, which has been warmed by the refrigerant mixture condensing in the upper end of the pipe. This heat absorption preheats outside air before it contacts coil 16 acting as evaporator. Then the pre-warmed outside air flows over evaporator 16 and releases heat thereby causing low pressure refrigerant mixture therein to evaporate. The inside air, warmed by heat released from the coil 18 acting as condenser, is circulated back through port 4 into the interior of the building.

One advantage of using heat pipe 10 in this arrangement is that the preheat given to the cold air increases the temperature of operation of the evaporator and reduces the frosting which normally occurs in cold weather. This frosting severely limits heat transfer in conventional system and restricts efficiency of heat recovery at low temperature. Another advantage resulting from the use of the heat pipe core is the lowering of the condensation temperature.

For summer operation, core 10 may be kept in the same position. The reversing valve 27 is activated to direct refrigerant mixture in fluid circuit 15 towards coil 18. Now air from the outside entering inlet 6 is warmer than air from the inside of the building entering inlet 2. The air from inside the building flows over the end 26 of core 10 and then past coil 18 which is now the evaporator and evaporates refrigerant mixture therein by giving up heat thereto. The cooled inside air re-enters through outlet 4. The outside air entering inlet 6 is used to condense refrigerant mixture at higher end 24 of the heat pipe and in coil 16 (now the condenser) before exhausting to the outside of the building through outlet 8.

The non-azeotropic refrigerant mixture enclosed in the regenerative heat pipe 10, i.e. the "second refrigerant" referred to above, is a binary mixture. However, the working fluid in the active air/air heat pump system i.e. the "first refrigerant" referred to above is a ternary mixture. The reasons behind the use of non-azeotropic refrigerant mixtures in the new systems is outlined below.

Both non-azeotropic mixtures employed in the new system are believed to be environmentally sound, because they meet the standards established by the United Nations Environmental Program (UNEP) agency.

USE OF NON-AZEOTROPIC REFRIGERANT MIXTURES (NARM)

The thermodynamic performance of any energy conversion device may be improved potentially by using a non-azeotropic mixture in a vapour cycle. A non-azeotropic mixture has a temperature distribution parallel to that of the surrounding fluid with which heat transfer takes place during the evaporation and condensation processes. Interest has increased in recent years in the use of such mixtures to improve the performance of energy conversion devices; such mixtures also allow substances to be used which are less harmful to the environment than those conventionally used.

Figure 2:
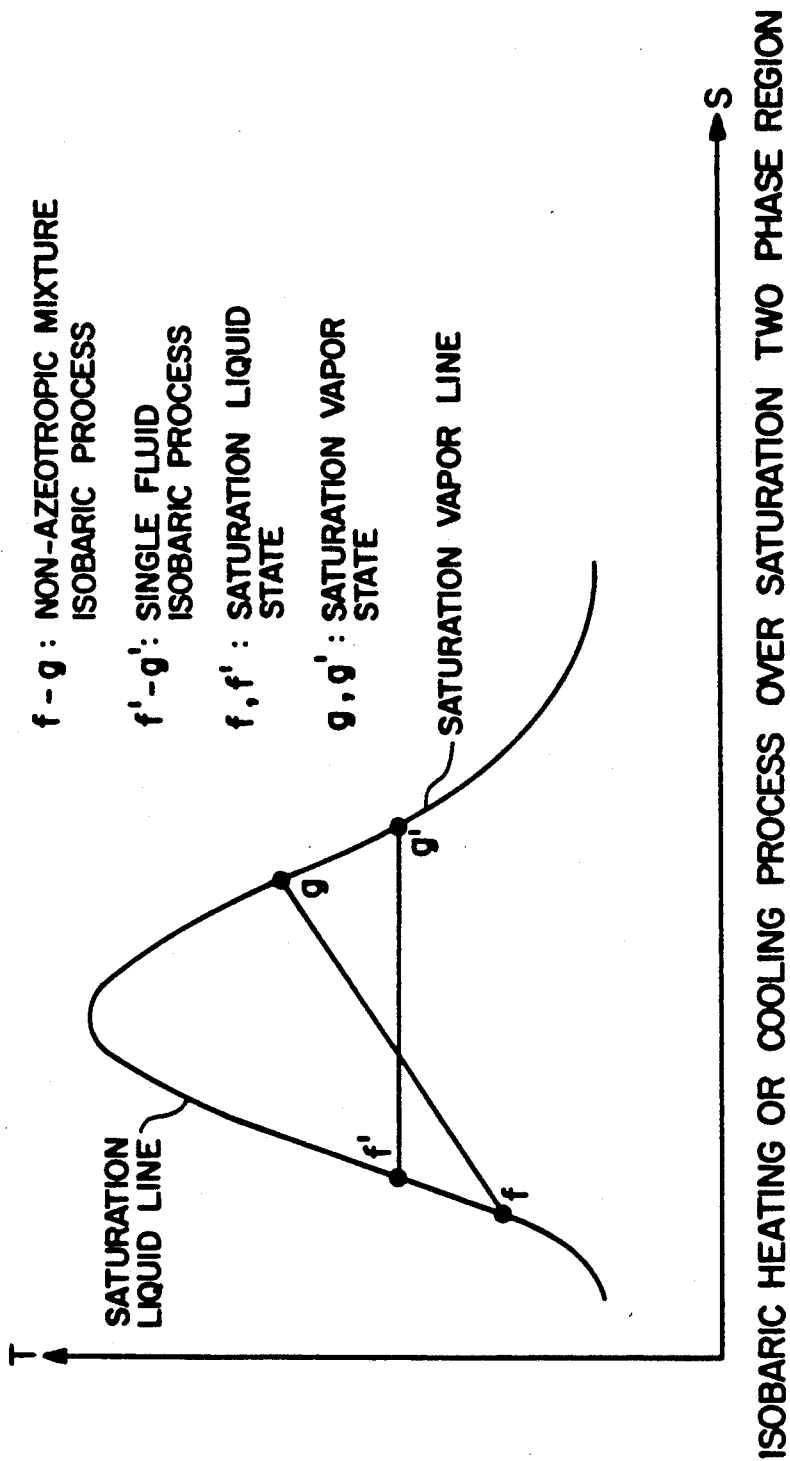
FIG. 2 is a temperature/entropy diagram showing lines for pure refrigerants and for non-azeotropic refrigerant mixtures.

An azeotropic mixture of two substances or more cannot be separated into its components by distillation. Such a mixture evaporates and condenses as a single substance with properties that are different from those of either constituents. Whereas pure substances or azeotropic mixtures have a constant phase changing temperature at a given pressure, non-azeotropic mixtures show separate boiling and condensing distributions, as shown in FIG. 2 by the two isobaric processes fg and f'g'.

Figure 3:
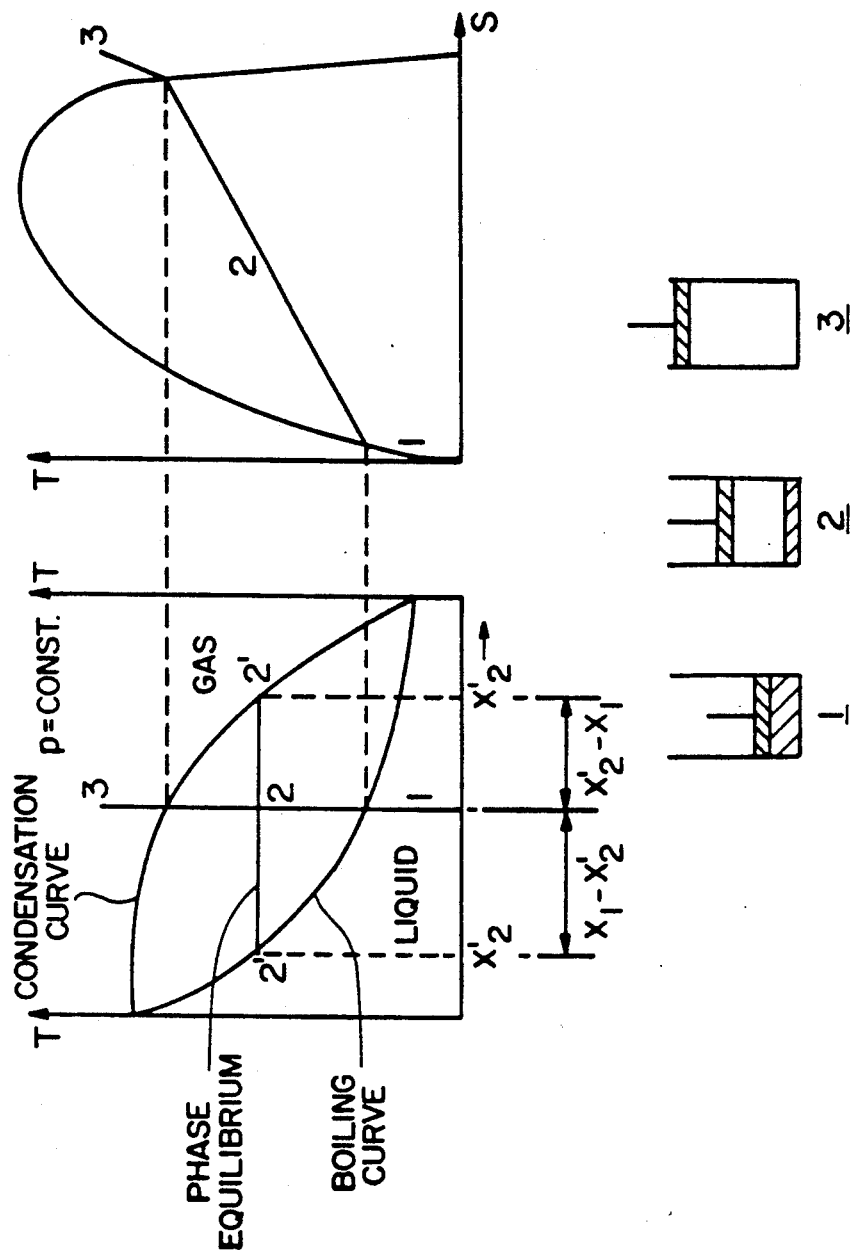
FIG. 3 is a phase diagram for a non-azeotropic mixture.

Therefore, at a given composition or concentration, the non-azeotropic mixture condenses and boils over a temperature range by an isobaric heating process 1-2-3-4-5, as clearly shown in FIG. 3. The difference in temperature at points f and g is termed the "glide" temperature. High and low pressure regions, Ph and P1, are also shown on the pressure (p)-mass concentration (x)-temperature (T) diagram.

The preferred "first refrigerant" used in the active heat pump is a mixture described and claimed in co-pending U.S. Pat. application No. 700,709, filed May 16, 1991. It consists essentially of:

| | | |
|---|---|---|
| trifluoromethane (R-23): | 4% to 10% | |
| 1,1-difluoroethane (R-152a): | 4% to 30% | |
| chlorodifluoromethane (R-22): | Balance | |
| Preferred compositions are as follows: | | |
| | (a) | (b) | (c) |
| R-23 | 4-6% | 7-10% | 4-6% |
| R-152a | 4-6% | 4-6% | 8-30% |
| R-22 | Balance | Balance | Balance |

The preferred "second refrigerant" consists essentially of:

| | |
|---|---|
| chlorodifluoromethane (R-22): | 60% to 80% |
| 1,1-difluoroethane (R-152a): | 40% to 20% |
| The preferred composition is 70% R-22 and 30% R-152a. | |

PERFORMANCE CHARACTERISTICS

A 3 ton integrated system as described has been constructed and fully instrumented in order to monitor the performance in the laboratory of the Research Centre for Energy Conversion (R.C.E.C.), University of Moncton, New Brunswick, Canada.

FIGS. 4 through 11 display the performance characteristics of the new design obtained at condensing temperatures ranging from +15° C. to 21° C.

Based on extensive laboratory testing at the R.C.E.C., the new design yields coefficient of performance (COP) which can be higher than 4 at −25° C. outside temperature and with a variable condenser temperature from 15° C. to 21° C. It is also worthwhile mentioning that this system has the capability to produce domestic hot water (DHW) through a desuperheater. In a desuperheater, the hot refrigerant line is used to heat the DHW circulating from the DHW tank, eliminating the need for electric heating.

A suitable comparison is shown in FIG. 11 between the integrated heat pump of this invention and a conventional air source heat pump under American Refrigeration Institution (ARI) - 240 standard, where the inside air temperature at inlet 2 is 21° C.

In addition, the results presented in these figures clearly showed that the performance of this system has been significantly enhanced by the use of non-azeotropic refrigerant mixtures.

Based on the experimental data obtained at the laboratories of the Research Centre for Energy Conversion, University of Moncton, the proposed system efficiency on the average is 2.5 times as large as the conventional air/air heat pump at low outside air temperatures.

REFERENCES

1. Dinh, K., U.S. Pat. No. 4,938,035
2. Sami, S. M., U.S. Pat. application No. 071,694
3. Linton, J. W. "A Comparison of Ventilation Strategies for R-2000 Houses", NRC No. 25463, TR-LT-004, 1986
4. Linton, J. W. "Design, Construction, and Testing of an Exhaust Air Heat Pump for R-2000 Houses", NRC No. 27719, TR-LT-013, 1987.

I claim:

1. An air-to-air heat pump for a building comprising:
a first passageway having an inlet and an outlet both communicating with air outside the building, and means for moving air through the first passageway from the inlet to the outlet, said first passageway having a first heat exchanger constituting an evaporator for a first refrigerant contained therein during a heating cycle;
a second passageway having an inlet and an outlet both communicating with relatively warm air inside the building, and means for moving air from the inlet to the outlet, said second passageway having a second heat exchanger constituting a condenser for said first refrigerant contained therein during a heating cycle;
means for pumping said first refrigerant in an active heat pump circuit which includes said first and second heat exchangers, and pressure reducing means for maintaining the pressure of refrigerant higher in the second heat exchanger than in the first heat exchanger during the heating cycle;
a reversing valve for reversing the flow of said first refrigerant during a cooling cycle;
a heat pipe containing a second refrigerant, said heat pipe having a first normally higher end in the first passageway and a second, normally lower end in the second passageway, said second refrigerant being capable of being evaporated by said relatively warm air in the second passageway and being capable of being condensed by cold air in the said first passageway;
said first end being positioned in the first passageway upstream of the first heat exchanger whereby cold air is pre-heated by condensation of said second refrigerant before contacting said first heat exchanger so that frosting on the first heat exchanger in cold air is inhibited; and
said second end being positioned in the second passageway upstream of said second heat exchanger.

2. An air-to-air heat pump according to claim 1, wherein said heat pipe is adjustable so that in the cooling cycle the first end can be placed lower than the second end.

3. An air-to-air heat pump according to claim 1, wherein the heat pump is a self-contained unit capable of being placed totally inside the building except for the inlet and outlet to the first passageway.

4. An air-to-air heat pump according to any of claims 1 to 3, wherein said first refrigerant is a non-azeotropic refrigerant mixture consisting essentially of

| | |
|---|---|
| trifluoromethane (R-23): | 4% to 10% |
| 1,1-difluoroethane (R-152a): | 4% to 30% |
| chorodifluoromethane (R-22): | Balance. |

5. An air-to-air heat pump according to any of claims 1 to 3, wherein said second refrigerant consists essentially of:

| | |
|---|---|
| chlorodifluoromethane (R-22): | 60% to 80% |
| 1,1-difluoroethane (R-152a): | 40% to 20%. |

6. An air-to-air heat pump according to claim 1, wherein said active heat pump circuit includes a coil resistor located to receive the first refrigerant immediately after it has passed through the second heat exchanger.

7. A method of heating a building with an air-to-air heat pump, of the kind in which relatively cold air from outside the building is circulated through a first passageway having an evaporator while evaporating a first refrigerant contained therein at low pressure, the air being returned to the outside, while warm air from inside the building is circulated through a second passageway while condensing said first refrigerant in a condenser at higher pressure and receiving heat therefrom, the warm air being returned to the inside of the building; and characterized in that frosting on the evaporator in cold weather is inhibited by passing the cold air in the first passageway over an end of a heat pipe before such air reaches the evaporator, said heat pipe having its other end in the second passageway and transferring heat therefrom to the first passageway.

8. A method according to claim 7, wherein said first refrigerant is a non-azeotropic refrigerant mixture consisting essentially of:

| | |
|---|---|
| trifluoromethane (R-23): | 4% to 10%, |
| 1,1-difluoroethane (R-152a): | 4% to 30%, |
| chlorodifluoromethane (R-22): | Balance. |

9. A method according to claim 7, wherein the warm inside air is passed over said other end of the heat pipe before passing over said condenser.

10. A method according to claim 6 or 7, wherein said heat pipe contains a second refrigerant which consists essentially of:

| | |
|---|---|
| chlorodifluoromethane (R-22): | 60% to 80%, |
| 1,1-difluoroethane (R-152a): | 40% to 20%. |

* * * * *